United States Patent
McCune et al.

(10) Patent No.: US 9,239,012 B2
(45) Date of Patent: *Jan. 19, 2016

(54) FLEXIBLE SUPPORT STRUCTURE FOR A GEARED ARCHITECTURE GAS TURBINE ENGINE

(71) Applicant: United Technologies Corporation, Hartford, CT (US)

(72) Inventors: Michael E. McCune, Colchester, CT (US); Jason Husband, South Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/604,811

(22) Filed: Jan. 26, 2015

(65) Prior Publication Data

US 2015/0345398 A1    Dec. 3, 2015

Related U.S. Application Data

(63) Continuation-in-part of application No. 13/623,309, filed on Sep. 20, 2012, now Pat. No. 9,133,729, which is a continuation-in-part of application No. 13/342,508, filed on Jan. 3, 2012, now Pat. No. 8,297,916.

(60) Provisional application No. 61/494,453, filed on Jun. 8, 2011.

(51) Int. Cl.
    *F01D 25/16*    (2006.01)
    *F02C 7/32*     (2006.01)
    *F02C 7/36*     (2006.01)

(52) U.S. Cl.
    CPC .... *F02C 7/32* (2013.01); *F02C 7/36* (2013.01)

(58) Field of Classification Search
    CPC ...... F02C 7/36; F01D 25/164; F05D 2260/96
    See application file for complete search history.

(56) References Cited

U.S. PATENT DOCUMENTS

4,084,861 A * 4/1978 Greenberg et al. ............. 384/99
4,201,513 A   5/1980 Sales
(Continued)

FOREIGN PATENT DOCUMENTS

| CA | 2789325 | 4/2013 |
|---|---|---|
| CA | 2789465 | 4/2013 |

(Continued)

OTHER PUBLICATIONS

International Preliminary Report on Patentability for International Application No. PCT/US2013/060105 mailed on Apr. 2, 2015.

(Continued)

*Primary Examiner* — Liam McDowell
(74) *Attorney, Agent, or Firm* — Carlson, Gaskey & Olds, P.C.

(57) ABSTRACT

A gas turbine engine includes a fan shaft and a support which supports the fan shaft. The support defines at least one of a support transverse and a support lateral stiffness. A gear system drives the fan shaft. A flexible support at least partially supports the gear system, and defines at least one of a flexible support transverse and a flexible support lateral stiffness with respect to at least one of the support transverse and the support lateral stiffness. An input to the gear system defines at least one of an input transverse and an input lateral stiffness with respect to at least one of the support transverse and the support lateral stiffness. A method of designing a gas turbine engine is also disclosed.

30 Claims, 9 Drawing Sheets

(56) References Cited

U.S. PATENT DOCUMENTS

| | | | |
|---|---|---|---|
| 5,433,674 | A | 7/1995 | Sheridan et al. |
| 6,073,439 | A | 6/2000 | Beaven et al. |
| 6,223,616 | B1 | 5/2001 | Sheridan et al. |
| 6,260,351 | B1 | 7/2001 | Delano |
| 6,663,530 | B2 | 12/2003 | Poulin et al. |
| 6,735,954 | B2 | 5/2004 | MacFarlane et al. |
| 6,855,089 | B2 | 2/2005 | Poulin et al. |
| 6,895,741 | B2 | 5/2005 | Rago et al. |
| 7,104,918 | B2 | 9/2006 | Mitrovic |
| 7,144,349 | B2 | 12/2006 | Mitrovic |
| 7,223,197 | B2 | 5/2007 | Poulin et al. |
| 7,451,592 | B2 | 11/2008 | Taylor et al. |
| 7,591,754 | B2 | 9/2009 | Duong et al. |
| 7,631,484 | B2 | 12/2009 | Giffin et al. |
| 7,665,293 | B2 | 2/2010 | Wilson et al. |
| 7,704,178 | B2 | 4/2010 | Sheridan |
| 7,841,163 | B2 | 11/2010 | Welch et al. |
| 7,841,165 | B2 | 11/2010 | Orlando |
| 7,926,260 | B2 | 4/2011 | Sheridan et al. |
| 7,959,532 | B2 | 6/2011 | Suciu et al. |
| 8,001,763 | B2 | 8/2011 | Grabowski et al. |
| 8,172,717 | B2 | 5/2012 | Lopez et al. |
| 8,297,916 | B1 | 10/2012 | McCune et al. |
| 8,640,336 | B2 | 2/2014 | Sheridan et al. |
| 2007/0214795 | A1 | 9/2007 | Cooker et al. |
| 2008/0097813 | A1 | 4/2008 | Collins et al. |
| 2008/0098713 | A1 | 5/2008 | Orlando et al. |
| 2010/0105516 | A1 | 4/2010 | Sheridan et al. |
| 2011/0106510 | A1 | 5/2011 | Poon |
| 2011/0116510 | A1 | 5/2011 | Breslin et al. |
| 2011/0130246 | A1 | 6/2011 | McCune et al. |
| 2011/0286836 | A1 | 11/2011 | Davis |
| 2013/0224003 | A1 | 8/2013 | Kupratis et al. |

FOREIGN PATENT DOCUMENTS

| | | |
|---|---|---|
| EP | 253548 | 1/1988 |
| EP | 2270361 | 1/2011 |
| EP | 2532841 A2 | 12/2012 |
| EP | 2551488 A2 | 1/2013 |
| WO | 2014047040 A1 | 3/2014 |

OTHER PUBLICATIONS

European Search Report for European Patent Application No. 12170479.5 completed on Jun. 26, 2014.

Grzegorz Litak et al.: "Dynamics of a Gear System with Faults in Meshing Stiffness", Nonlinear Dynamics, Kluwer Academic Publishers, DO, vol. 41, No. 4, Sep. 1, 2005, pp. 415-421.

European Search Report for European Patent Application No. 12170483.7 completed on Apr. 29, 2014.

International Search Report and Written Opinion for International Application No. PCT/US2013/060105 completed on Jan. 30, 2014.

European Search Report for European Application No. 15152745.4 mailed Jun. 15, 2015.

European Search Report for European Patent Application No. 15175203.7 mailed Oct. 15, 2015.

European Search Report for European Patent Application No. 15175205.2 mailed Oct. 15, 2015.

\* cited by examiner

FLEXIBLE SUPPORT STRUCTURE FOR A GEARED ARCHITECTURE GAS TURBINE ENGINE

CROSS REFERENCE TO RELATED APPLICATIONS

The present disclosure is a continuation-in-part of U.S. patent application Ser. No. 13/623,309, filed Sep. 20, 2012, which is a continuation-in-part of U.S. application Ser. No. 13/342,508, filed Jan. 3, 2012, now U.S. Pat. No. 8,297,916, issued Oct. 30, 2012, which claimed priority to U.S. Provisional Application No. 61/494,453, filed Jun. 8, 2011.

BACKGROUND

The present disclosure relates to a gas turbine engine, and more particularly to a flexible support structure for a geared architecture therefor.

Epicyclic gearboxes with planetary or star gear trains may be used in gas turbine engines for their compact designs and efficient high gear reduction capabilities. Planetary and star gear trains generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate. An advantage of epicyclic gear trains is that a rotary input can be connected to any one of the three elements. One of the other two elements is then held stationary with respect to the other two to permit the third to serve as an output.

In gas turbine engine applications, where a speed reduction transmission is required, the central sun gear generally receives rotary input from the powerplant, the outer ring gear is generally held stationary and the planet gear carrier rotates in the same direction as the sun gear to provide torque output at a reduced rotational speed. In star gear trains, the planet carrier is held stationary and the output shaft is driven by the ring gear in a direction opposite that of the sun gear.

During flight, light weight structural cases deflect with aero and maneuver loads causing significant amounts of transverse deflection commonly known as backbone bending of the engine. This deflection may cause the individual sun or planet gear's axis of rotation to lose parallelism with the central axis. This deflection may result in some misalignment at gear train journal bearings and at the gear teeth mesh, which may lead to efficiency losses from the misalignment and potential reduced life from increases in the concentrated stresses.

SUMMARY

In a featured embodiment, a gas turbine engine includes a fan shaft and a support which supports at least a portion of the fan shaft. The support defines at least one of a support transverse and a support lateral stiffness. A gear system drives the fan shaft. A flexible support at least partially supports the gear system, and defines at least one of a flexible support transverse and a flexible support lateral stiffness with respect to at least one of the support transverse and the support lateral stiffness. An input to the gear system defines at least one of an input transverse and an input lateral stiffness with respect to at least one of the support transverse and the support lateral stiffness.

In another embodiment according to the previous embodiment, at least one of a support transverse and lateral stiffness is a support transverse stiffness. At least one of a flexible support transverse and lateral stiffness is a flexible support transverse stiffness. At least one of an input transverse and lateral stiffness is an input transverse stiffness.

In another embodiment according to any of the previous embodiments, the support and the flexible support are mounted to a static structure.

In another embodiment according to any of the previous embodiments, the support and the flexible support are mounted to a static structure of a gas turbine engine.

In another embodiment according to any of the previous embodiments, the support and the flexible support are mounted to a front center body of a gas turbine engine.

In another embodiment according to any of the previous embodiments, the flexible support is mounted to a planet carrier of the gear system.

In another embodiment according to any of the previous embodiments, the input is mounted to a sun gear of the gear system.

In another embodiment according to any of the previous embodiments, the fan shaft is mounted to a ring gear of the gear system.

In another embodiment according to any of the previous embodiments, the gear system is a star system.

In another embodiment according to any of the previous embodiments, the flexible support is mounted to a ring gear of the gear system.

In another embodiment according to any of the previous embodiments, the input is mounted to a sun gear of the gear system.

In another embodiment according to any of the previous embodiments, the fan shaft is mounted to a planet carrier of the gear system.

In another embodiment according to any of the previous embodiments, a low speed spool drives the input.

In another embodiment according to any of the previous embodiments, the flexible support transverse stiffness and the input transverse stiffness are both less than the support transverse stiffness.

In another embodiment according to any of the previous embodiments, at least one of the flexible support transverse stiffness and the input transverse stiffness is less than about 20% of the support transverse stiffness.

In another embodiment according to any of the previous embodiments, the flexible support transverse stiffness and the input transverse stiffness are each less than about 20% of the support transverse stiffness.

In another embodiment according to any of the previous embodiments, at least one of the flexible support transverse stiffness and the input transverse stiffness is less than about 11% of the support transverse stiffness.

In another embodiment according to any of the previous embodiments, the flexible support transverse stiffness and the input transverse stiffness are each less than about 11% of the support transverse stiffness.

In another embodiment according to any of the previous embodiments, a turbine provides an input to the gear system.

In another embodiment according to any of the previous embodiments, the gear system further drives a compressor rotor at a common speed with the fan shaft.

In another embodiment according to any of the previous embodiments, a turbine section drives the gear system and at least two compressor rotors. The turbine section includes a fan drive turbine which drives the gear system and at least two other turbines to drive at least two compressor rotors.

In another featured embodiment, a gas turbine engine includes a fan shaft, a support supports at least a portion of the fan shaft. A gear system drives the fan shaft, and includes a gear mesh that defines a gear mesh transverse stiffness. A flexible support at least partially supports the gear system, and defines a flexible support transverse stiffness with respect to the gear mesh transverse stiffness. An input to the gear system defines an input transverse stiffness with respect to the gear mesh transverse stiffness.

In another embodiment according to the previous embodiment, both the flexible support transverse stiffness and the input transverse stiffness are less than the gear mesh transverse stiffness.

In another embodiment according to any of the previous embodiments, the flexible support transverse stiffness is less than about 8% of the gear mesh transverse stiffness.

In another embodiment according to any of the previous embodiments, the input transverse stiffness is less than about 5% of the gear mesh transverse stiffness.

In another embodiment according to any of the previous embodiments, a transverse stiffness of a ring gear of the gear system is less than about 20% of the gear mesh transverse stiffness.

In another embodiment according to any of the previous embodiments, a transverse stiffness of a ring gear of the gear system is less than about 12% of the gear mesh transverse stiffness.

In another embodiment according to any of the previous embodiments, a transverse stiffness of a planet journal bearing which supports a planet gear of the gear system is less than or equal to the gear mesh transverse stiffness.

In a featured embodiment, a method of designing a gas turbine engine includes providing a fan shaft. A support is provided that supports at least a portion of the fan shaft. The support defines at least one of a support transverse and a support lateral stiffness. A gear system drives the fan shaft. A flexible support at least partially supports the gear system, and defines at least one of a flexible support transverse and a flexible support lateral stiffness with respect to the at least one of the support transverse and the support lateral stiffness. An input to the gear system defines at least one of an input transverse and an input lateral stiffness with respect to the at least one of the support transverse and the support lateral stiffness.

In another embodiment according to the previous embodiment, the method includes a turbine section to drive the gear system and at least two compressor rotors. A fan drive turbine drives the gear system. At least two other turbines drive at least two compressor rotors.

The various features and advantages of this invention will become apparent to those skilled in the art from the following detailed description of an embodiment. The drawings that accompany the detailed description can be briefly described as follows.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
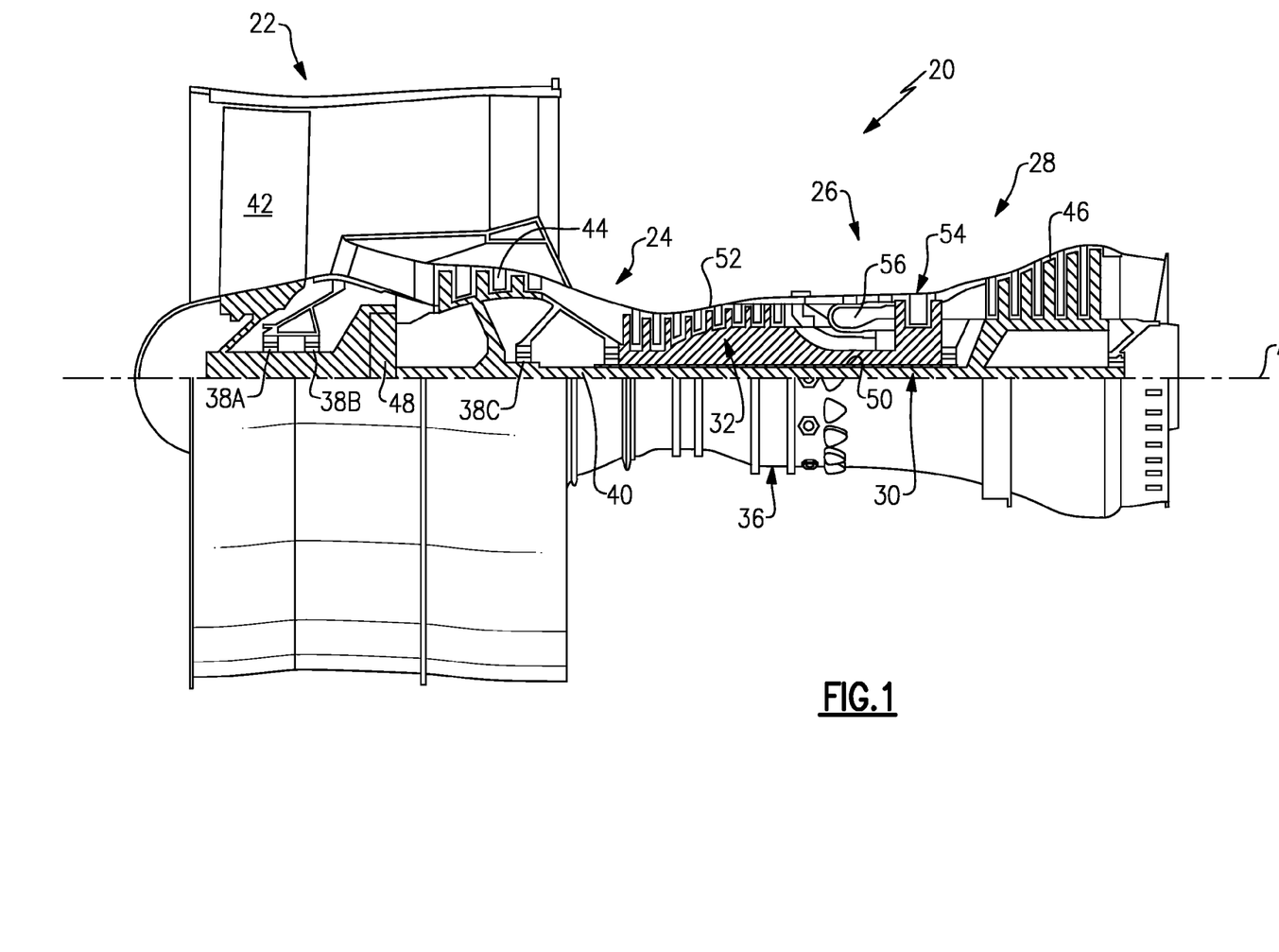
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
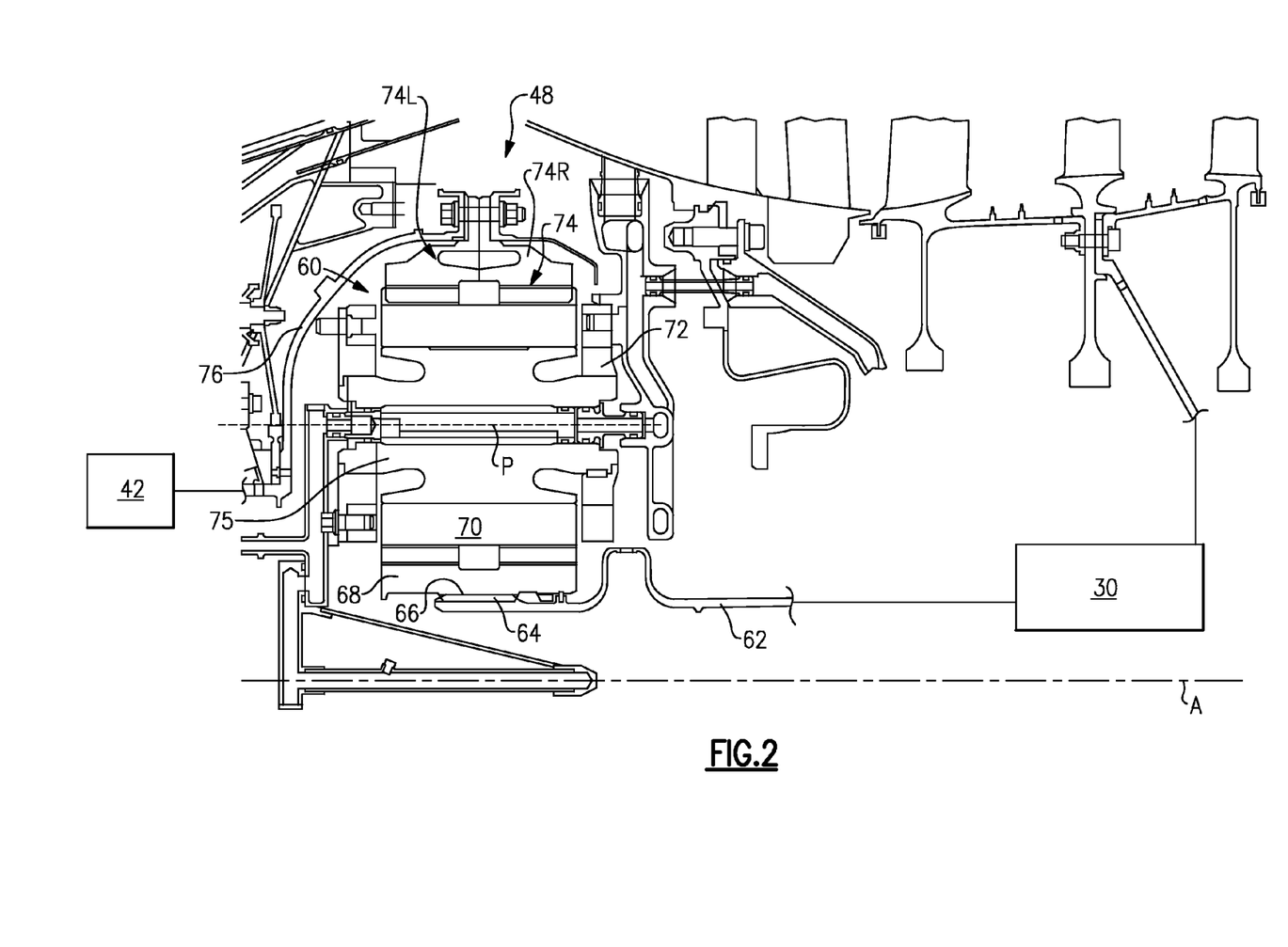
FIG. 2 is an enlarged cross-section of a section of the gas turbine engine which illustrates a fan drive gear system (FDGS)

With reference to FIG. 2, the geared architecture 48 generally includes a fan drive gear system (FDGS) 60 driven by the low speed spool 30 (illustrated schematically) through an input 62. The input 62, which may be in the form of a coupling, both transfers torque from the low speed spool 30 to the geared architecture 48 and facilitates the segregation of vibrations and other transients therebetween. In the disclosed non-limiting embodiment, the FDGS 60 may include an epicyclic gear system which may be, for example, a star system or a planet system.

The input coupling 62 may include an interface spline 64 joined, by a gear spline 66, to a sun gear 68 of the FDGS 60. The sun gear 68 is in meshed engagement with multiple planet gears 70, of which the illustrated planet gear 70 is representative. Each planet gear 70 is rotatably mounted in a planet carrier 72 by a respective planet journal bearing 75. Rotary motion of the sun gear 68 urges each planet gear 70 to rotate about a respective longitudinal axis P.

Each planet gear 70 is also in meshed engagement with rotating ring gear 74 that is mechanically connected to a fan shaft 76. Since the planet gears 70 mesh with both the rotating ring gear 74 as well as the rotating sun gear 68, the planet gears 70 rotate about their own axes to drive the ring gear 74 to rotate about engine axis A. The rotation of the ring gear 74 is conveyed to the fan 42 (FIG. 1) through the fan shaft 76 to thereby drive the fan 42 at a lower speed than the low speed spool 30. It should be understood that the described geared architecture 48 is but a single non-limiting embodiment and that various other geared architectures will alternatively benefit herefrom.

Figure 3:
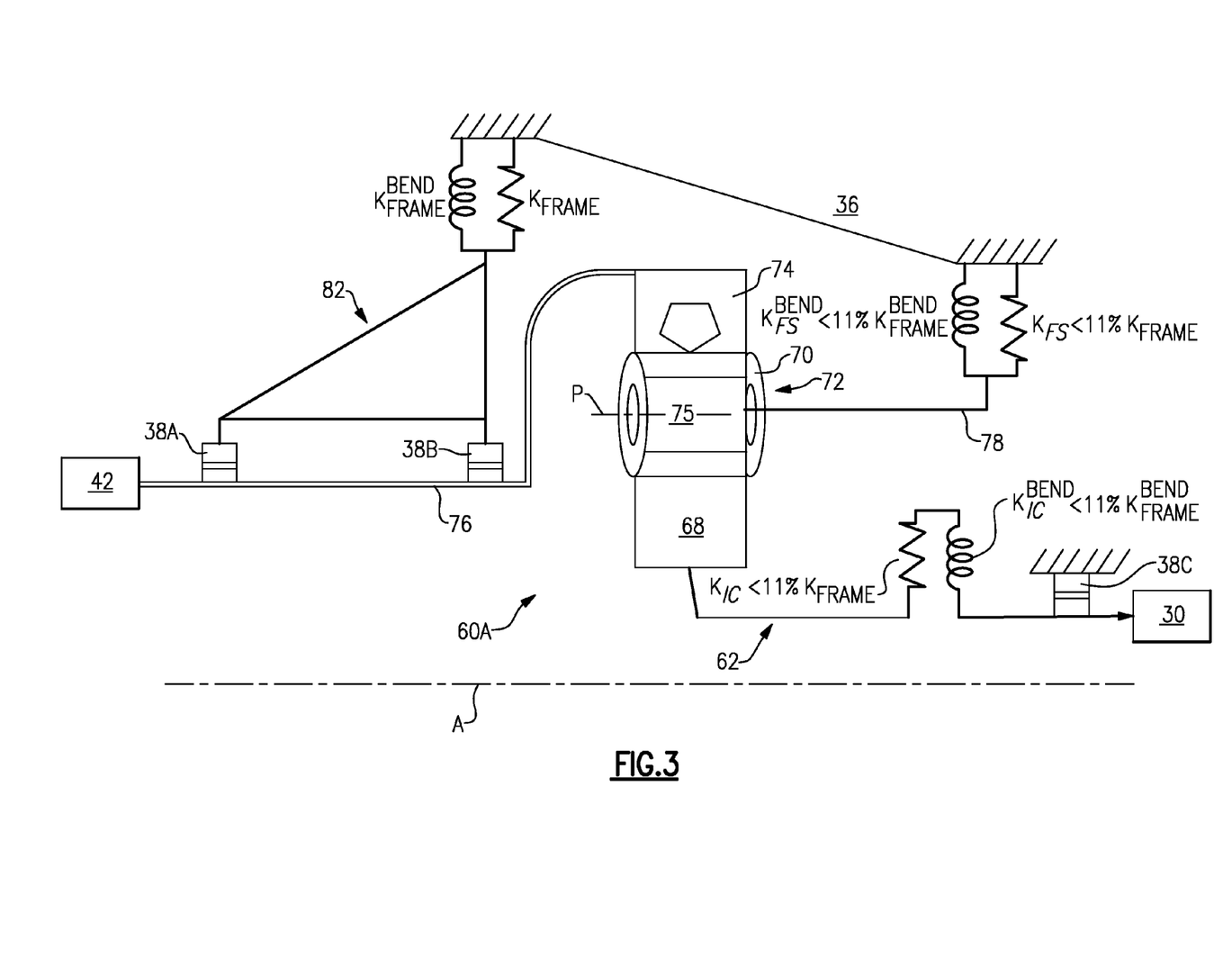
FIG. 3 is a schematic view of a flex mount arrangement for one non-limiting embodiment of the FDGS.

With reference to FIG. 3, a flexible support 78 supports the planet carrier 72 to at least partially support the FDGS 60A with respect to the static structure 36 such as a front center body which facilitates the segregation of vibrations and other transients therebetween. It should be understood that various gas turbine engine case structures may alternatively or additionally provide the static structure and flexible support 78. It should be understood that lateral as defined herein is generally transverse to the axis of rotation A and the term "transverse" refers to a pivotal bending movement with respect to the axis of rotation A which typically absorbs deflection applied to the FDGS 60. The static structure 36 may further include a number 1 and 1.5 bearing support static structure 82 which is commonly referred to as a "K-frame" which supports the number 1 and number 1.5 bearing systems 38A, 38B. Notably, the K-frame bearing support defines a lateral stiffness (represented as Kframe in FIG. 3) and a transverse stiffness (represented as $Kframe^{BEND}$ in FIG. 3) as the referenced factors in this non-limiting embodiment.

In this disclosed non-limiting embodiment, the lateral stiffness (KFS; KIC) of both the flexible support 78 and the input coupling 62 are each less than about 11% of the lateral stiffness (Kframe). That is, the lateral stiffness of the entire FDGS 60 is controlled by this lateral stiffness relationship. Alternatively, or in addition to this relationship, the transverse stiffness of both the flexible support 78 and the input coupling 62 are each less than about 11% of the transverse stiffness ($Kframe^{BEND}$). That is, the transverse stiffness of the entire FDGS 60 is controlled by this transverse stiffness relationship.

Figure 4:
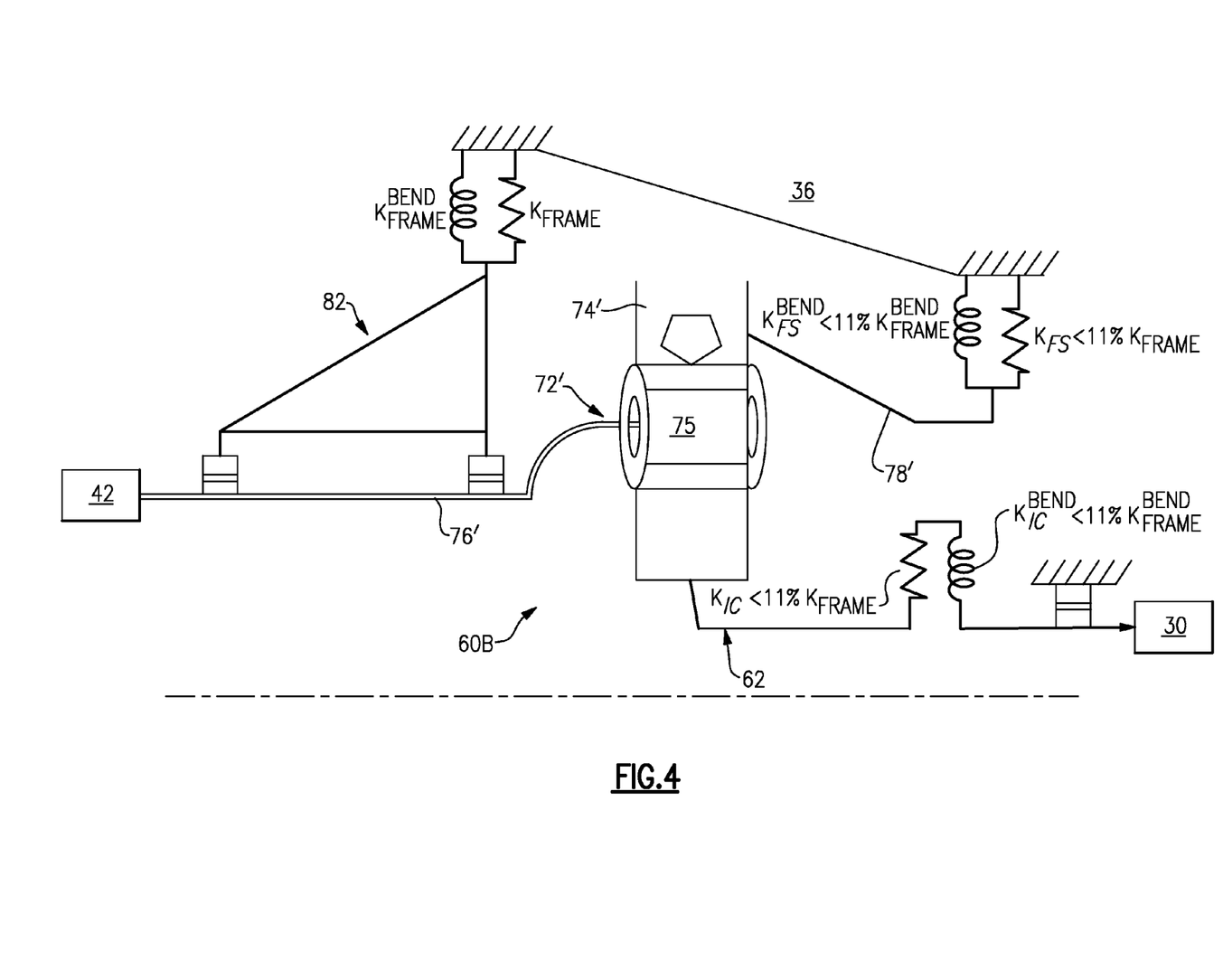
FIG. 4 is a schematic view of a flex mount arrangement for another non-limiting embodiment of the FDGS.

With reference to FIG. 4, another non-limiting embodiment of a FDGS 60B includes a flexible support 78' that supports a rotationally fixed ring gear 74'. The fan shaft 76' is driven by the planet carrier 72' in the schematically illustrated planet system which otherwise generally follows the star system architecture of FIG. 3.

Figure 5:
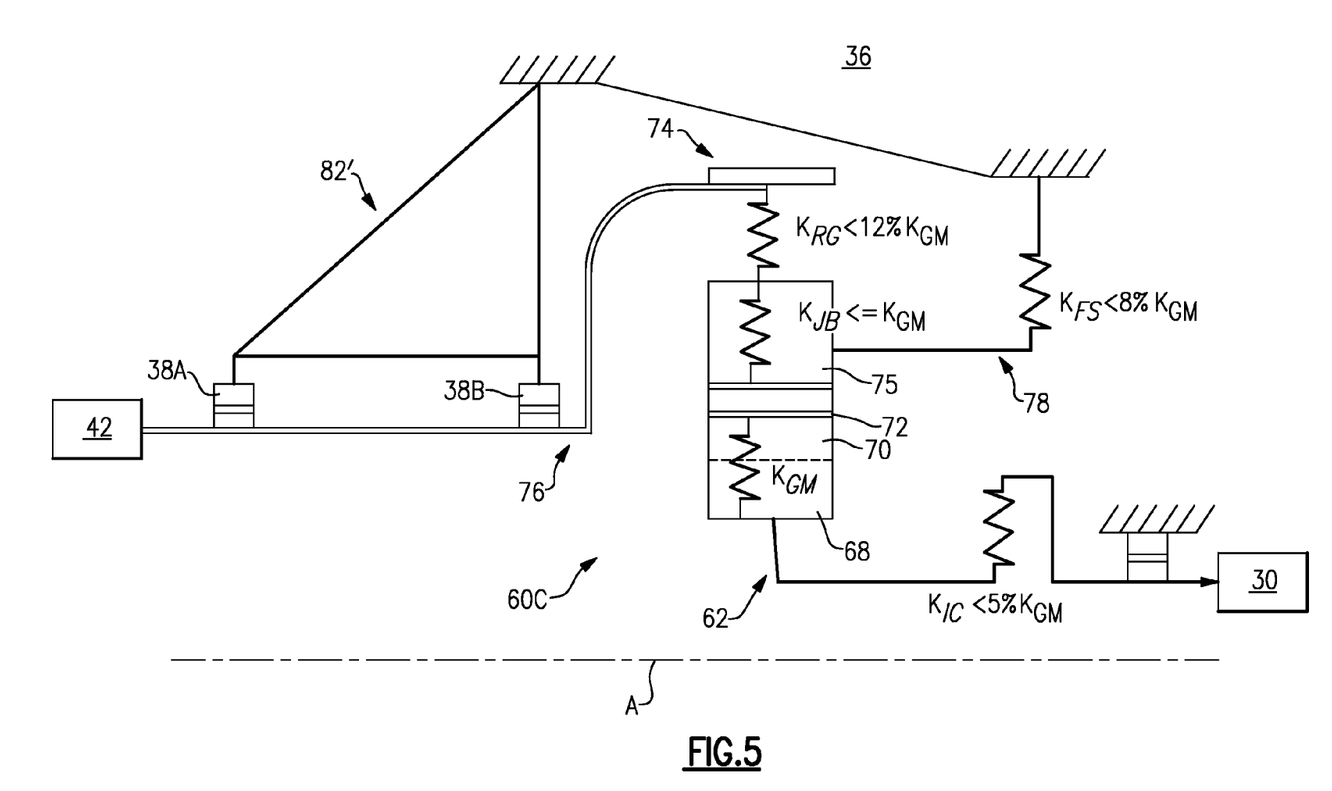
FIG. 5 is a schematic view of a flex mount arrangement for another non-limiting embodiment of a star system FDGS.

With reference to FIG. 5, the lateral stiffness relationship within a FDGS 60C itself (for a star system architecture) is schematically represented. The lateral stiffness (KIC) of an input coupling 62, a lateral stiffness (KFS) of a flexible support 78, a lateral stiffness (KRG) of a ring gear 74 and a lateral stiffness (KJB) of a planet journal bearing 75 are controlled with respect to a lateral stiffness (KGM) of a gear mesh within the FDGS 60.

In the disclosed non-limiting embodiment, the stiffness (KGM) may be defined by the gear mesh between the sun gear 68 and the multiple planet gears 70. The lateral stiffness (KGM) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The lateral stiffness (KJB) may be mechanically defined by, for example, the stiffness within the planet journal bearing 75 and the lateral stiffness (KRG) of the ring gear 74 may be mechanically defined by, for example, the geometry of the ring gear wings 74L, 74R (FIG. 2).

In the disclosed non-limiting embodiment, the lateral stiffness (KRG) of the ring gear 74 is less than about 12% of the lateral stiffness (KGM) of the gear mesh; the lateral stiffness (KFS) of the flexible support 78 is less than about 8% of the lateral stiffness (KGM) of the gear mesh; the lateral stiffness (KJB) of the planet journal bearing 75 is less than or equal to the lateral stiffness (KGM) of the gear mesh; and the lateral stiffness (KIC) of an input coupling 62 is less than about 5% of the lateral stiffness (KGM) of the gear mesh.

Figure 6:
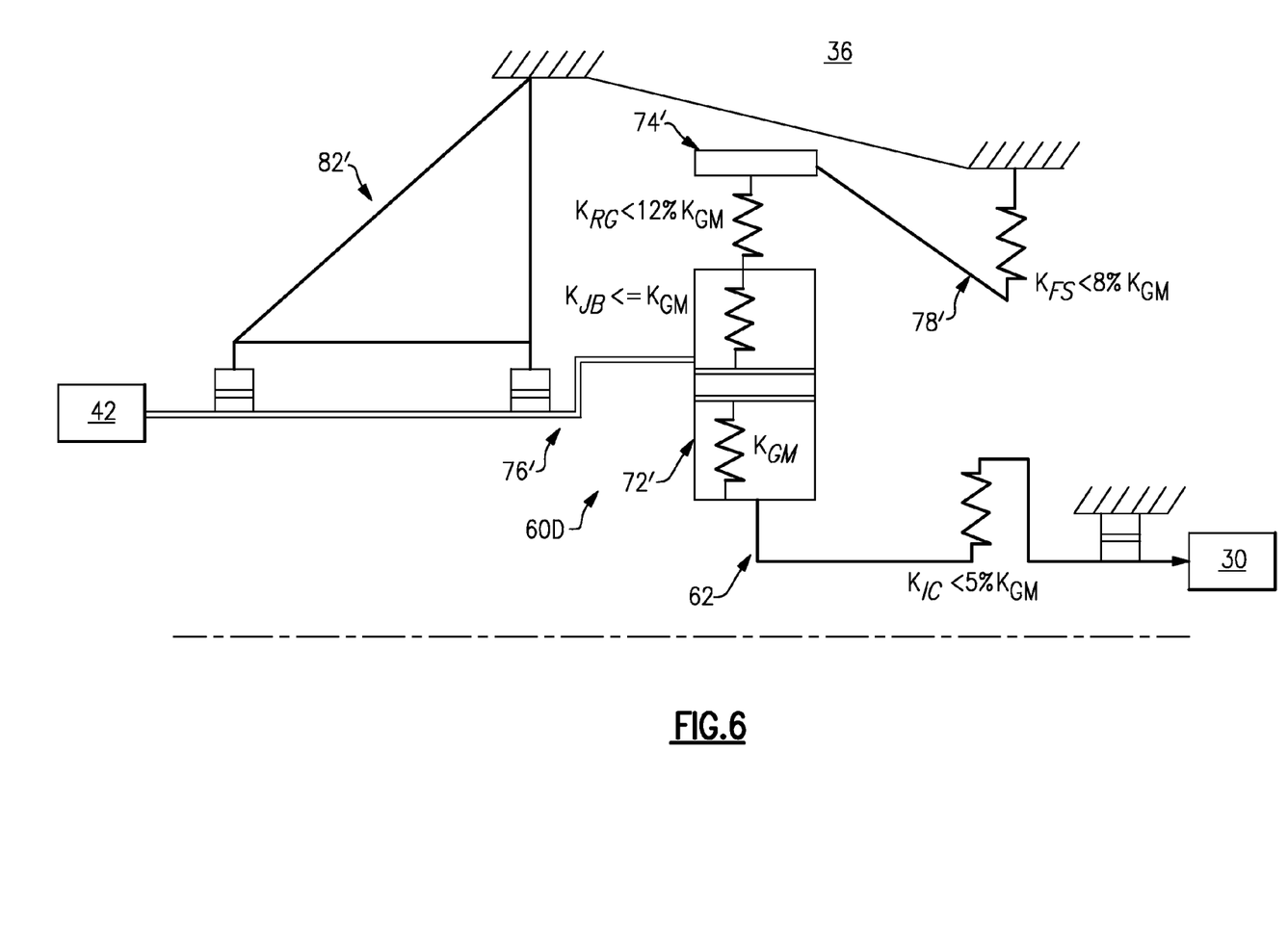
FIG. 6 is a schematic view of a flex mount arrangement for another non-limiting embodiment of a planetary system FDGS.

With reference to FIG. 6, another non-limiting embodiment of a lateral stiffness relationship within a FDGS 60D itself are schematically illustrated for a planetary gear system architecture, which otherwise generally follows the star system architecture of FIG. 5.

It should be understood that combinations of the above lateral stiffness relationships may be utilized as well. The lateral stiffness of each of structural components may be readily measured as compared to film stiffness and spline stiffness which may be relatively difficult to determine.

By flex mounting to accommodate misalignment of the shafts under design loads, the FDGS design loads have been reduced by more than 17% which reduces overall engine weight. The flex mount facilitates alignment to increase system life and reliability. The lateral flexibility in the flexible support and input coupling allows the FDGS to essentially 'float' with the fan shaft during maneuvers. This allows: (a) the torque transmissions in the fan shaft, the input coupling and the flexible support to remain constant during maneuvers; (b) maneuver induced lateral loads in the fan shaft (which may otherwise potentially misalign gears and damage teeth) to be mainly reacted to through the number 1 and 1.5 bearing support K-frame; and (c) both the flexible support and the input coupling to transmit small amounts of lateral loads into the FDGS. The splines, gear tooth stiffness, journal bearings, and ring gear ligaments are specifically designed to minimize gear tooth stress variations during maneuvers. The other connections to the FDGS are flexible mounts (turbine coupling, case flex mount). These mount spring rates have been determined from analysis and proven in rig and flight testing to isolate the gears from engine maneuver loads. In addition, the planet journal bearing spring rate may also be controlled to support system flexibility.

Figure 7:
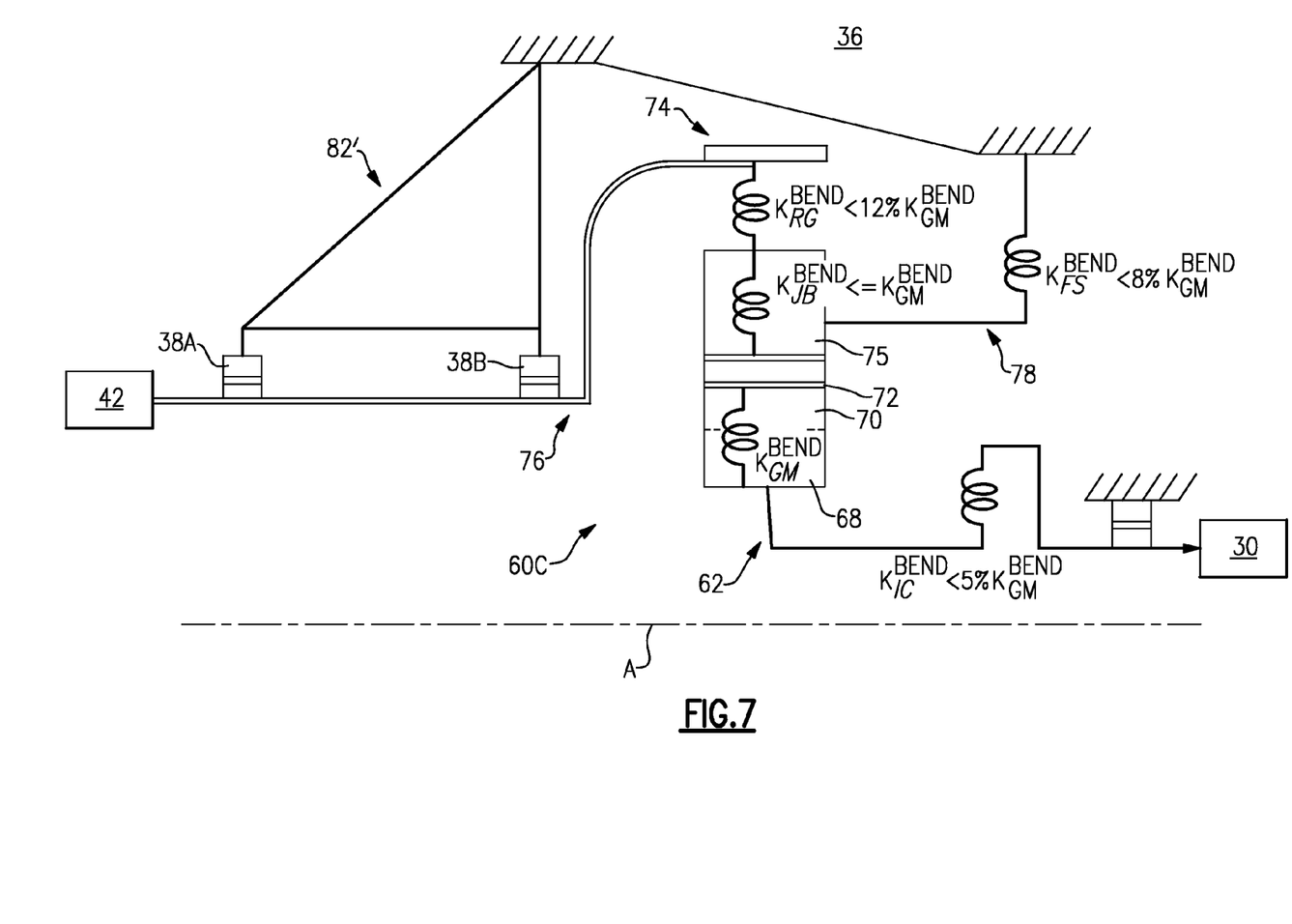
FIG. 7 is a schematic view of a flex mount arrangement for another non-limiting embodiment of a star system FDGS.

FIG. 7 is similar to FIG. 5 but shows the transverse stiffness relationships within the FDGS 60C (for a star system architecture). The transverse stiffness ($KIC^{BEND}$) of the input coupling 62, a transverse stiffness ($KFS^{BEND}$) of the flexible support 78, a transverse stiffness ($KRG^{BEND}$) of the ring gear 74 and a transverse stiffness ($KJB^{BEND}$) of the planet journal bearing 75 are controlled with respect to a transverse stiffness ($KGM^{BEND}$) of the gear mesh within the FDGS 60.

In the disclosed non-limiting embodiment, the stiffness ($KGM^{BEND}$) may be defined by the gear mesh between the sun gear 68 and the multiple planet gears 70. The transverse stiffness ($KGM^{BEND}$) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The transverse stiffness ($KJB^{BEND}$) may be mechanically defined by, for example, the stiffness within the planet journal bearing 75 and the transverse stiffness ($KRG^{BEND}$) of the ring gear 74 may be mechanically defined by, for example, the geometry of the ring gear wings 74L, 74R (FIG. 2).

In the disclosed non-limiting embodiment, the transverse stiffness ($KRG^{BEND}$) of the ring gear 74 is less than about 12% of the transverse stiffness ($KGM^{BEND}$) of the gear mesh; the transverse stiffness ($KFS^{BEND}$) of the flexible support 78 is less than about 8% of the transverse stiffness ($KGM^{BEND}$) of the gear mesh; the transverse stiffness ($KJB^{BEND}$) of the planet journal bearing 75 is less than or equal to the transverse stiffness ($KGM^{BEND}$) of the gear mesh; and the transverse stiffness ($KIC^{BEND}$) of an input coupling 62 is less than about 5% of the transverse stiffness ($KGM^{BEND}$) of the gear mesh.

Figure 8:
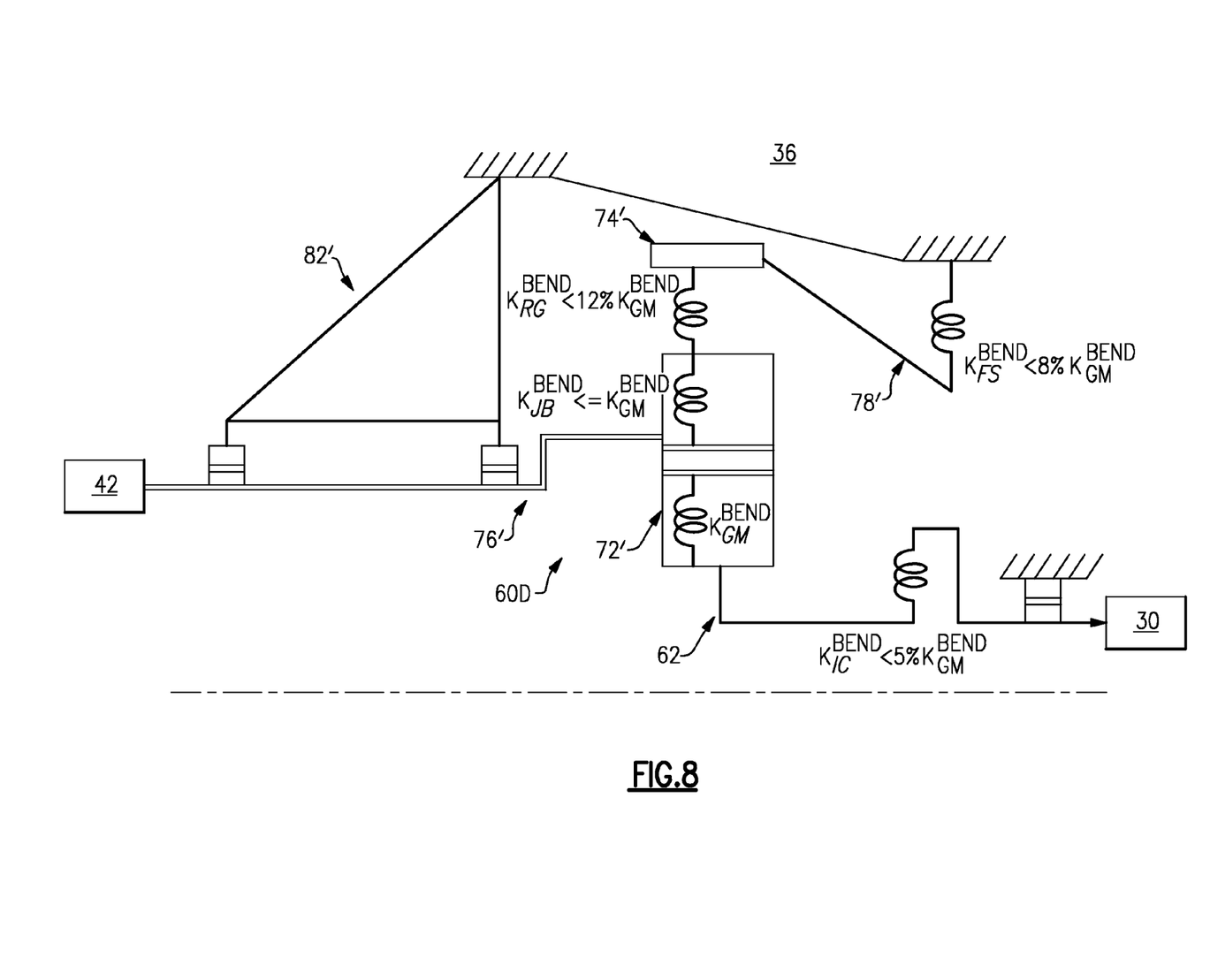
FIG. 8 is a schematic view of a flex mount arrangement for another non-limiting embodiment of a planetary system FDGS.

FIG. 8 is similar to FIG. 6 but shows the transverse stiffness relationship within the FDGS 60D for the planetary gear system architecture.

Figure 9:
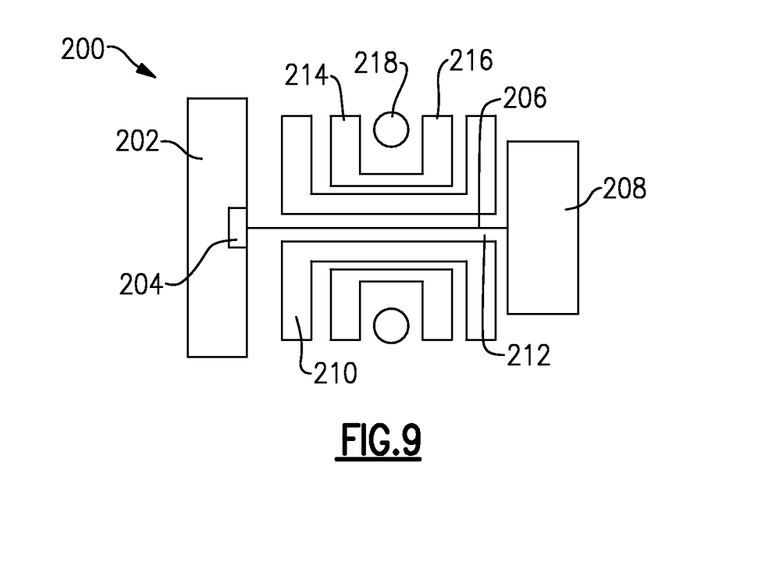
FIG. 9 shows another embodiment.

FIG. 9 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured, mounted and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 10:
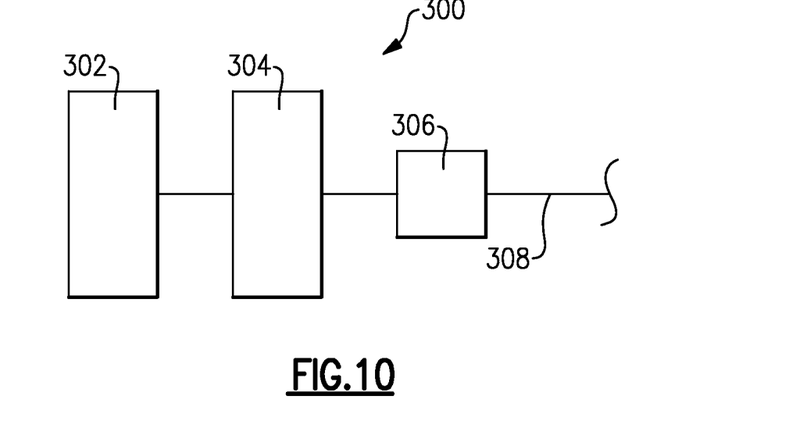
FIG. 10 shows yet another embodiment.

FIG. 10 shows yet another embodiment 300 wherein a fan rotor 302 and a first stage compressor 304 rotate at a common speed. The gear reduction 306 (which may be structured, mounted and operate as disclosed above) is intermediate the compressor rotor 304 and a shaft 308, which is driven by a low pressure turbine section.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
 a fan shaft;
 at least one bearing that supports the fan shaft;
 a support configured to support at least a portion of the fan shaft, the support defining at least one of a support transverse stiffness and a support lateral stiffness;
 a gear system configured to drive the fan shaft;
 a flexible support configured to at least partially support the gear system, the flexible support defining at least one of a flexible support transverse stiffness and a flexible support lateral stiffness with respect to the at least one of the support transverse stiffness and the support lateral stiffness; and
 an input to the gear system, the input defining at least one of an input transverse stiffness and an input lateral stiffness with respect to the at least one of the support transverse stiffness and the support lateral stiffness.

2. The gas turbine engine as recited in claim 1, wherein the at least one of the support transverse stiffness and the support lateral stiffness is a support transverse stiffness, the at least one of the flexible support transverse stiffness and the flexible support lateral stiffness is a flexible support transverse stiffness, and the at least one of the input transverse stiffness and the input lateral stiffness is an input transverse stiffness.

3. The gas turbine engine as recited in claim 2, wherein the support and the flexible support are mounted to a static structure.

4. The gas turbine engine as recited in claim 2, wherein the support and the flexible support are mounted to a static structure of the gas turbine engine.

5. The gas turbine engine as recited in claim 2, wherein the support and the flexible support are mounted to a front center body of the gas turbine engine.

6. The gas turbine engine as recited in claim 2, wherein the flexible support is mounted to a planet carrier of the gear system.

7. The gas turbine engine as recited in claim 6, wherein the input is mounted to a sun gear of the gear system.

8. The gas turbine engine as recited in claim 7, wherein the fan shaft is mounted to a ring gear of the gear system.

9. The gas turbine engine as recited in claim 8, wherein the gear system is a star system.

10. The gas turbine engine as recited in claim 2, wherein the flexible support is mounted to a ring gear of the gear system.

11. The gas turbine engine as recited in claim 10, wherein the input is mounted to a sun gear of the gear system.

12. The gas turbine engine as recited in claim 11, wherein the fan shaft is mounted to a planet carrier of the gear system.

13. The gas turbine engine as recited in claim 2, further comprising a low speed spool for driving the input.

14. The gas turbine engine as recited in claim 2, wherein the flexible support transverse stiffness and the input transverse stiffness are both less than the support transverse stiffness.

15. The gas turbine engine as recited in claim 14, wherein at least one of the flexible support transverse stiffness and the input transverse stiffness is less than about 20% of the support transverse stiffness.

16. The gas turbine engine as recited in claim 15, wherein the flexible support transverse stiffness and the input transverse stiffness are each less than about 20% of the support transverse stiffness.

17. The gas turbine engine as recited in claim 14, wherein at least one of the flexible support transverse stiffness and the input transverse stiffness is less than about 11% of the support transverse stiffness.

18. The gas turbine engine as recited in claim 17, wherein the flexible support transverse stiffness and the input transverse stiffness are each less than about 11% of the support transverse stiffness.

19. The gas turbine engine as recited in claim 2, wherein a turbine provides an input to the gear system.

20. The gas turbine engine as recited in claim 19, wherein the gear system further drives a compressor rotor at a common speed with the fan shaft.

21. The gas turbine engine as recited in claim 1, comprising a turbine section to drive the gear system and at least two compressor rotors, wherein the turbine section includes a fan drive turbine to drive the gear system and at least two other turbines to drive the at least two compressor rotors.

22. A gas turbine engine comprising:
a fan shaft;
at least one bearing that supports the fan shaft;
a support configured to support at least a portion of the fan shaft;
a gear system configured to drive the fan shaft, the gear system including a gear mesh that defines a gear mesh transverse stiffness;
a flexible support configured to at least partially support the gear system, the flexible support defining a flexible support transverse stiffness with respect to the gear mesh transverse stiffness; and
an input to the gear system, the input defining an input transverse stiffness with respect to the gear mesh transverse stiffness.

23. The gas turbine engine as recited in claim 22, wherein both the flexible support transverse stiffness and the input transverse stiffness are less than the gear mesh transverse stiffness.

24. The gas turbine engine as recited in claim 23, wherein the flexible support transverse stiffness is less than about 8% of the gear mesh transverse stiffness.

25. The gas turbine engine as recited in claim 23, wherein the input transverse stiffness is less than about 5% of the gear mesh transverse stiffness.

26. The gas turbine engine as recited in claim 22, wherein a transverse stiffness of a ring gear of the gear system is less than about 20% of the gear mesh transverse stiffness.

27. The gas turbine engine as recited in claim 22, wherein a transverse stiffness of a ring gear of the gear system is less than about 12% of the gear mesh transverse stiffness.

28. The gas turbine engine as recited in claim 22, wherein a transverse stiffness of a planet journal bearing which supports a planet gear of the gear system is less than or equal to the gear mesh transverse stiffness.

29. A method of designing a gas turbine engine comprising:
providing a fan shaft;
providing at least one bearing that supports the fan shaft;
providing a support configured to support at least a portion of the fan shaft, the support defining at least one of a support transverse stiffness and a support lateral stiffness;
providing a gear system configured to drive the fan shaft;
providing a flexible support configured to at least partially support the gear system, the flexible support defining at least one of a flexible support transverse stiffness and a flexible support lateral stiffness with respect to the at least one of the support transverse stiffness and the support lateral stiffness; and
providing an input to the gear system, the input defining at least one of an input transverse stiffness and an input lateral stiffness with respect to the at least one of the support transverse stiffness and the support lateral stiffness.

30. The method as recited in claim 29, comprising providing a turbine section to drive the gear system and at least two compressor rotors, wherein the turbine section includes a fan drive turbine to drive the gear system and at least two other turbines to drive the at least two compressor rotors.

* * * * *